Jan. 18, 1938. A. A. GOESE 2,106,093
DAMPER CONSTRUCTION
Filed Feb. 17, 1936
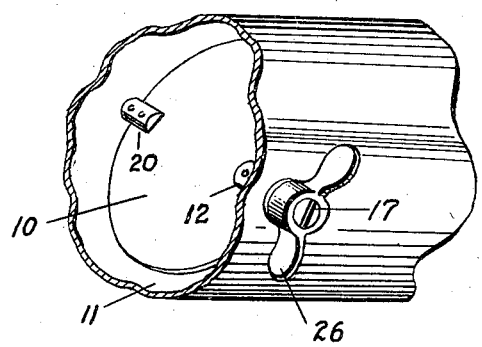
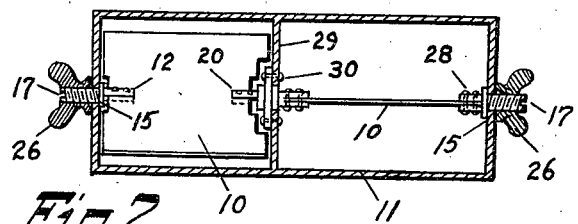
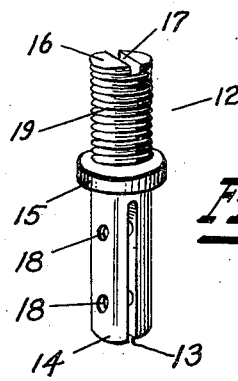
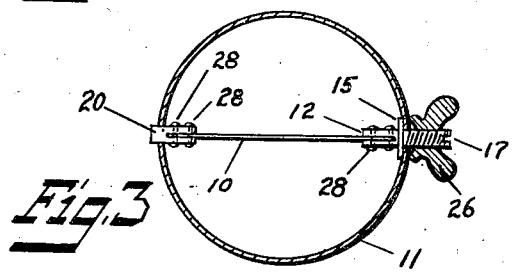
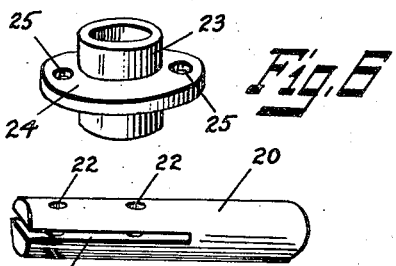
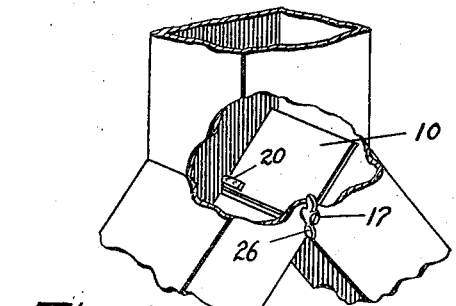
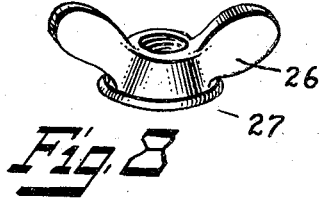
INVENTOR.
ARTHUR A. GOESE
BY
ATTORNEY.

Patented Jan. 18, 1938

2,106,093

UNITED STATES PATENT OFFICE 2,106,093

DAMPER CONSTRUCTION

Arthur A. Goese, Milwaukee, Wis.

Application February 17, 1936, Serial No. 64,391

2 Claims. (Cl. 126—292)

My invention relates to damper construction generally and more particularly to types thereof adapted for use in heating and ventilating flues and like ducts.

An object of my invention is to provide a damper that can be adjusted to a desired angular position of use and retained against unauthorized readjustment to another position of use.

Another object of my invention is to provide a damper that is operable to a desired position by a means apart from the damper and its mounting and means cooperative with the damper whereby it is substantially locked in such position, thereby preventing unauthorized persons from tampering with the set position thereof.

Still another object of my invention is to provide a damper that is applicable to either round or rectangular ducts, and has attaching parts to facilitate its assembly and installation on ducts of sheet metal construction at a minimum cost.

It is manifest to any one familiar with the art that it is desirable at times to set a damper in a predetermined position of operation, with the assurance that it will not be tampered with. My invention affords this convenience and protection by making the damper operable only through the medium of a coin, screw driver or the like, and providing a securing means, such as a wing nut, that must be manipulated following each authorized setting of the damper to release it for resetting to a different angle or position.

With the foregoing and other objects and advantages of equal importance in view, the invention resides in the certain new and useful combinations, constructions, and arrangements of parts as will be hereinafter more fully described, set forth in the appended claims, and illustrated in the accompanying drawing, in which:

Fig. 1 is a perspective view of the improved damper as it appears when installed in a cylindrical duct, Fig. 2 is a side elevation, partly in section, of a modified form of the damper as it appears when installed in a dual rectangular duct, Fig. 3 is a transverse section through the damper and duct as shown in Figure 1, the damper being turned to a position diametrically of the duct, Fig. 4 is a fragmentary perspective view of a rectangular branch duct and showing another modified form of the damper applied thereto to control the flow of air in the branches, Fig. 5 is a perspective view of the threaded operating and supporting stud, per se, Fig. 6 is a perspective view of a flanged supporting bushing for use with the form of damper shown in Figure 2, Fig. 7 is a detail of the other of the supporting studs per se, and Fig. 8 is a perspective view of the winged nut for co-operation with the threaded operating and supporting stud to retain the damper in a set position.

Referring to the drawing, wherein like characters of reference denote corresponding parts in the several views thereof, 10 indicates a damper body formed from a flat piece of metal which may be either circular or rectangular in shape. A stud 12 of cylindrical construction as shown in Figure 5, has a slot 13 opening outwardly of the end 14 and has its inner end terminating in proximity to an annular flange 15, at or adjacent the center of the stud 12. An end 16 of the stud 12 is screw threaded outwardly from the other side of the annular flange 15, and has a slot 17 formed diametrically of its end face; said slot 17 being preferably arranged in substantial alignment with the slot 13 in the end 14. A plurality of apertures 18 are provided through the stud 12 in an angular relation to the slot 13 and are employed to receive rivets 28 when fastening the stud 12 to a damper plate 10, which plate is inserted into the slot 13.

A similar stud 20, as shown in Figure 7, is employed to support the damper plate 10 when said plate is inserted into a slot 21 extending inwardly from one end of the body of the stud 20. There are also a plurality of apertures 22 provided through the stud 20 in angular relation to the slot 21 and are to receive rivets 28 when fastened to a damper plate 10.

A bushing 23 as shown in Figure 6 has an annular flange 24 intermediate its ends which is provided with several apertures 25 to receive rivets 30 or the like to be employed to fasten said bushing to the partition wall of the duct 11.

Figure 8 shows a threaded winged nut 26 to be engaged on the thread 19 of the stud 12 to clamp the wall of the duct 11 between the same and the flange 15.

These stud and bushing parts constitute a damper assembly that permits the construction of a suitable damper for any shape or size of duct, when used in conjunction with a suitable piece of sheet metal cut to fit the contour of the inside of a duct or flue. By employing this method, it is only necessary for the mechanic or manufacturer to carry one size of parts for dampers in stock, to greatly simplify damper construction.

In operation, holes are punched or drilled through the side walls of the duct, to receive the studs 12 and 20 as shown in Figure 1. A plate 10 of the proper contour to fit the inside of the duct 11 is inserted into the slot 13 of the stud 12 and the slot 21 of the stud 20. Holes are punched through the plate 10 to register with the apertures 18 and 22 respectively, and suitable rivets 28 are inserted and securely fastened. The flange 15 of the stud 12 being on the inside of the duct will permit only the threaded end of the stud 12 to protrude and by engaging the winged nut 26 on to the thread 19, it will clamp the wall of the duct between itself and the flange 15. Now, by using a screw driver or coin in the slot 17, of the stud 12 the damper plate may be set any desired angle and held in place by tightening the nut 26. This will prevent the damper plate 10 from being turned by children or other unauthorized persons and until it is desired or necessary to set it to another position of use.

When a center partition 29 is employed to separate two ducts as shown in Figure 2, a hole is punched in the partition 29 to accommodate the bushing 23 and rivets 30 are employed to fasten the bushing 23 in place. In this manner the bushing 23 will act as a bearing for a stud 20 which in turn acts as a support for the damper plate 10.

By fastening the plate 10 to one side only of the studs 12 and 20 as shown in Figure 4, a vane type of damper is produced and may be installed and held at a fixed angle in the same manner as the dampers previously described.

The invention is susceptible to various changes in its form and minor details of construction and the right is herein reserved to make such changes as properly fall within the scope of the appended claims.

Having thus described my invention what I claim and desire to secure by Letters Patent in the United States, is:

1. In a damper arrangement for use within a sectional duct employing a partition, a set of plates of a size to fit said ducts, studs engaging said plates in opposite sides of their outer walls, the inner ends of said studs being longitudinally slotted through their center, rivets adapted to engage both sides of said studs and the plate, a flanged bushing fastened to said partition, two of said studs journaled in said bushing, the remaining two threaded and projecting through the outer walls of said duct equipped with flanges projecting outwardly to contact the inside of the outer walls, slots in the outer face of said threaded studs arranged in parallel relation to said plates, and nuts engaging said threaded studs for contacting the outside face of said outer walls causing the outer walls to be forced against said flange on the threaded stud.

2. A damper for use within a duct comprising a damper plate, studs engaging opposite edges of said plate, the inner ends of said studs being diametrically slotted to receive said plate edges, one of said studs extending outwardly through a wall of the said duct and having its extended end threaded, a flange on said one stud to bear against the inner side of the wall of said duct, a slot disposed in the end of the threaded portion of the one stud, said slot extending parallel to the damper plate, and a nut engaging the threaded portion of said stud for clamping the wall of said duct between the same and said flange.

ARTHUR A. GOESE.